United States Patent Office 3,360,553
Patented Dec. 26, 1967

3,360,553
PROCESS FOR PRODUCING
HYDROXYBENZOIC ACID
Ryoichi Wakasa, Atsuo Nakanishi, and Naoya Kominami, Tokyo, Japan, assignors to Asahi Kasei Kogyo Kabushiki Kaisha, Osaka, Japan, a corporation of Japan
No Drawing. Filed July 16, 1963, Ser. No. 295,512
Claims priority, application Japan, July 19, 1962,
37/29,747
6 Claims. (Cl. 260—521)

This invention relates to a process for producing hydroxybenzoic acid from cresol.

Conventional oxidation of the ordinary aralkyl group can not generally be utilized for producing hydroxybenzoic acid from cresol because the hydroxyl group of the cresol causes side-reactions such as, for example, oxidative decomposition of the benzene nucleus. The hydroxy group of cresol has to be protected by an appropriate means such as esterification, etherification, etc. So-called alkali-fusion oxidation is considered to be useful to that effect, viz. caustic alkali serves to substitute an alkali metal group for group of cresol and at the same time to oxidize the methyl group of cresol with or without assistance of a metal oxide or metal peroxide added to the reaction system. Lead peroxide, copper oxides, iron oxides, manganese oxide, etc., are known to be suitable as the aforesaid oxide or peroxide. However, the oxidation of cresol on a commercial scale is generally so difficult that there are many disadvantages to be overcome. Namely, a large amount of the metal oxide or metal peroxide is required and, accordingly the viscosity of the fused product increases so that stirring becomes very difficult. Nowadays, the so-called "Kolbe-Schmidt process" is employed starting from phenol.

It is an object of the present invention to provide a method for preparing hydroxybenzoic acid from cresol with high yield. According to the present invention, molecular oxygen is introduced into cresol in the molten state to oxidize cresol at a temperature more than 230° C. in the presence of an excess amount of caustic alkali together with metallic-copper, copper oxides (cupric oxide and cuprous oxide) or the compounds from which a catalytic amount of copper oxides is produced under the reaction conditions.

The copper oxides themselves are reduced in the reaction and the resultant reduced copper oxides are again easily oxidized by oxygen present in the reaction atmosphere to return to the original oxide form. Accordingly oxidation of cresol is considerably accelerated. Oxidation of copper proceeds very fast in comparison with that of iron, lead or manganese. The copper or copper oxides may be sufficient in an amount of as low as 0.1% by weight based on cresol. If the oxidation is effected by use of oxygen and in the absence of the copper catalyst, the oxidation of cresol proceeds very slowly. Furthermore, it gives rise to side reactions and lessens considerably the final yield of hydroxybenzoic acid. This will be seen from the following experiments. Potassium hydroxide was added to p-cresol in amount of twice as much as p-cresol (by weight). One portion of the resulting mixture was subjected to oxidation reaction by introducing oxygen in the absence of the copper catalyst at 260° C. for one hour. The other portion of the resulting mixture was subjected to the same oxidation reaction at the same conditions with the exception of the addition of cupric oxide in an amount of 1% by weight. Conversion rate of p-cresol was 31.6% in the first test, and 70% in the latter. Yield of p-hydroxybenzoic acid was 51% in the former, and 78% in the latter. On the other hand, if oxidation was carried out by using only the copper oxides without introducing oxygen, the copper oxides will be required in an amount of one to several times as much as cresol to obtain the same yield of p-hydroxybenzoic acid.

Cresol as the starting material in the invention may include ortho, metha, para cresol and the mixtures thereof, each of said cresols yielding the corresponding hydroxybenzoic acid.

Sodium hydroxide, potassium hydroxide or mixture thereof may be employed as the caustic alkali. A mixture is conveniently employed, because it melts at a relatively lower temperature. The amount of caustic alkali varies depending on the kinds or the mixing ratio of the alkalis, preferably 2–10 times (by weight) based on cresol. Too small an amount of alkali is liable to reduce the yield. Though the amount of caustic alkali should theoretically be two equivalent weights based on cresol, in practice, it is preferable that caustic alkali or other substances, such as sodium carbonate, sodium acetate, potassium acetate or calcium hydroxide be additionally used to conduct the reaction completely. Instead of using potassium hydroxide in 10 times an amount based on cresol, both potassium hydroxide and potassium acetate each in 5 times an amount based on cresol may be employed to obtain nearly the same result.

In carrying out the reaction, the addition of a small amount of water is more effectve, even at a comparatively lower temperature.

As the catalyst, metallic copper, copper oxides or compounds which produce copper oxides under the reaction conditions such as copper hydroxides, copper acetate, copper formate, etc. are employed. The amount is generally in the range between 0.1 and 50% by weight based on cresol, in many cases between 0.5 and 10%, especially less than 3%. It may vary within the above range depending on the reaction condition. The use in an amount more than 50% makes viscosity of the reactant too high and causes a local heating, The reaction temperature is more than 230° C., and is dependent on the change of the reaction conditions such as the kind of catalyst, etc., but is suitable at a temperature near 260° C. The reaction may be carried out at a temperature near 300° C., but such a high reaction temperature is harmful to the material of the reactor.

Oxygen is introduced into the reactor under normal pressure or high pressure. Heat generated from the use of oxygen in a higher concentration may be controlled by the feed velocity and the pressure or by diluting with other gases.

After the reaction is completed, the changed product is dissolved, and is filtered. Then the filtrate is acidified to produce hydroxybenzoic acid. The thus obtained hydroxybenzoic acid is filtered or is extracted with an appropriate solvent. The separated catalyst can be reused in the reaction.

Example 1

10 g. of p-cresol, 50 g. of potassium hydroxide, 10 g. of water and 0.3 g. of cupric oxide were heated to 250° C. with stirring in a nickel crucible. Oxygen was introduced thereinto at a velocity of 1 l./min. for one hour. The reaction material was in a liquid state for the entire period. After the reaction was completed, water was added to produce a slurry state. The resulting solution was filtered to separate potassium hydroxide, and water was further added. Catalyst was filtered. Sulfuric acid was added to the filtrate to acidify the same. After unchanged p-cresol was separated by steam distillation, p-hydroxybenzoic acid was extracted with ether. Conversion rate of p-cresol was 75%, and yield of p-hydroxybenzoic acid based on p-cresol changed was 78%.

Example 2

The mixture consisting of 10 g. of o-cresol, 25 g. of potassium hydroxide, 25 g. of sodium hydroxide, 10 g. of water and 0.3 g. of copper acetate were allowed to react and then were treated in the same manner as in Example 1. Conversion rate of o-cresol was 70%, and yield of salicyclic acid based on o-cresol consumed was 75%.

What we claim is:

1. A process for producing hydroxybenzoic acid which comprises introducing molecular oxygen containing gas into cresol melted at a temperature more than 230° C. in the presence of an excess amount of caustic alkali, and at least one catalyst member selected from the group consisting of metallic copper, copper oxides, and copper oxides-producing compounds at the reaction condition.

2. A process according to claim 1, wherein the cresol is selected from the group consisting of o-, m-, p-cresol and a mixture thereof.

3. A process according to claim 1, wherein the caustic alkali is selected from the group consisting of sodium hydroxide, potassium hydroxide and a mixture thereof.

4. A process according to claim 1, wherein the copper oxides producing compounds are selected from the group consisting of copper hydroxide, copper acetate and copper formate.

5. A process as claimed in claim 1 wherein said caustic alkali is present in an amount 10 times by weight based on cresol.

6. A process as claimed in claim 1 wherein said catalyst member is present in an amount between 0.1 and 50% by weight based on cresol.

References Cited

UNITED STATES PATENTS

| | | | |
|---|---|---|---|
| 1,694,122 | 12/1928 | Jaeger | 260—524 |
| 1,815,985 | 7/1931 | Pansegrau | 260—524 |
| 1,851,361 | 3/1932 | Jaeger | 260—524 |

FOREIGN PATENTS

| | | |
|---|---|---|
| 797,213 | 6/1958 | Great Britain. |

LORRAINE A. WEINBERGER, *Primary Examiner.*

S. B. WILLIAMS, D. STENZEL, *Assistant Examiners.*